March 15, 1927.　　　　F. W. HOBBS　　　　1,620,972
FISH LURE
Filed April 22, 1926
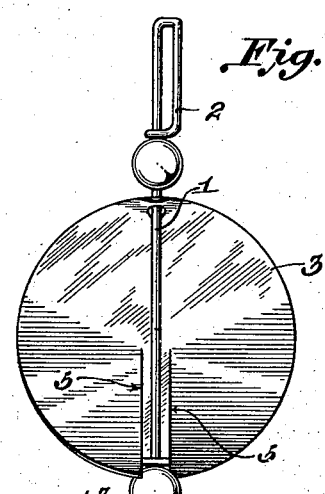
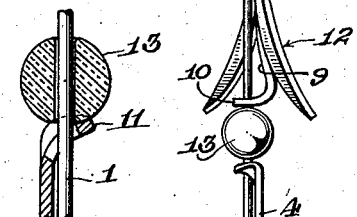
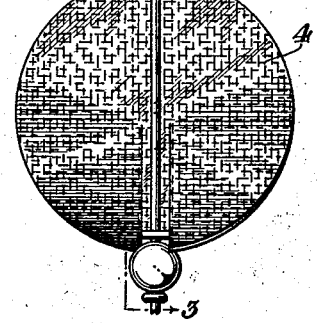
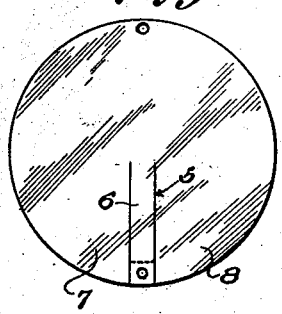
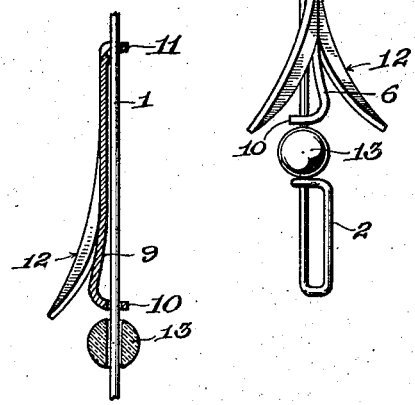
Inventor
Franklin W. Hobbs.
By William C. Linton.
Attorney Patented Mar. 15, 1927.

1,620,972

UNITED STATES PATENT OFFICE.

FRANKLIN W. HOBBS, OF BANGOR, MAINE.

FISH LURE.

Application filed April 22, 1926. Serial No. 103,899.

This invention relates to improvements in fish lures, having for an object to provide a novel form of spinning lure advantageous and practicable for either trolling or plug fishing, which when moved through a body of water, will have the lure proper thereon rotated in different directions and at relatively different speeds whereby to serve as an attraction or lure to fish and as a stimulus to their "striking".

It is also an object of the invention to provide a spinning lure of the character mentioned, in connection with which novel forms of spinner lure units are employed, said units being so constructed as to permit the stamping of the same from a single piece of material, providing a simultaneous operation, means for imparting rotary motion to the same during their passage through water and also, bearing means, whereby said units may be rotatably mounted upon a suitable supporting means.

Another and equally important object of the invention may be stated to reside in the provision of a spinner fish lure unit wherein wings are formed upon portions of the same and so disposed that by slightly varying their respective or relative pitch, the unit will be caused to rotate at different speeds when moved through water.

Yet another object of the invention is to provide a fish lure wherein the oppositely rotatable spinner lure units are of different colors, so that when the device is moved through a body of water, the units will rotate in opposite directions and at different velocities whereby a variety of optical effects will be had by reason of the intensity and reflection of light upon the same, providing different and changing colors upon the units and hence, lending to its attracting qualities.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

In these drawings:
Figure 1 is a side elevation of the improved spinner lure, Figure 2 is a similar view taken at substantially right angles to the Figure 1, Figure 3 is a longitudinal section taken on the line 3—3 of Figure 1,
Figure 4 is a plan view of one of the blanks from which the spinner lure units are constructed, and
Figure 5 is an enlarged fragmentary detail, partly in section, showing the manner in which one portion of each of the spinner lure units is rotatably mounted upon an adjacent bearing means arranged on the supporting wire carrying the spinner lure units.

Having more particular reference to the drawings in connection with which like characters of reference will designate corresponding parts throughout, the improved lure may be stated to comprise a supporting rod or wire designated at this time by the numeral 1, said wire being formed of a single length of material and having its opposite ends bent into the shape of elongated loops designated by the numeral 2, these loops, obviously, serving as means to permit the attaching of a line and hooks or bait thereto.

Prior to the forming of the elongated loops 2 upon the opposite end portions of the wire 1, spinner lure units designated in their entireties by the numerals 3 and 4 are engaged upon such wire 1, these units 3 and 4 each comprising preferably circular disks of thin sheet metal or other suitable material having relatively parallel and substantially radially disposed slits 5 formed therein in the manner as shown in the Figures 1 and 4, providing thereby, an intermediate arm portion 6 while wing portions 7 and 8 are formed upon the opposite sides of such arm portion. This arm portion 6, preferably simultaneously with the slitting of the body of the unit as at 5, is bent upon itself or so formed as to provide a slightly curved intermediate portion 9 while the outer or free end thereof is angularly disposed and apertured as indicated at 10, whereby to provide a bearing portion; a diametrically opposite portion of said unit, being formed with an offset and curved flange 11 having a bearing opening therein aligning with the bearing opening in the portion 10, so that the said unit may be rotatably mounted upon an adjacent portion of the supporting wire as is indicated in the accompanying drawings. In this connection, it will be understood that by reason of the curvature of the arm 9, said arm will have the bearing portion 10 thereof so arranged as to positively prevent contact of the intermediate portion of the unit with any adjacent portion of said supporting wire 1 and by consequence, friction during rotation of the unit about the supporting wire 1 will be reduced to minimum.

That the various spinner lure units 3 and 4 mounted upon the supporting wire 1 may be rotated when the device is moved through a body of water, the wings 7 and 8 are provided, said wings being curved upon themselves as is indicated by the numeral 12 in the Figures 1 and 2, such wings being extended and curved in opposite directions as is clearly shown, to either side of the bearing portion carrying arm 6, aforesaid. Thus, it will be appreciated that when the unit is moved through a body of water, the resistance offered by the curved wing portions 7 and 8 will be such as to effect rotation of the equipped unit. In this connection, it is to be noted that because of the manner in which the wings 7 and 8 are formed upon their respective units 3 or 4, said units will be caused to revolve or rotate upon the wire as the device in its entirety is either drawn through or lowered down into a body of water, thus rendering the lure advantageous and practicable for usage in trolling or in plug fishing.

In assembling a fish lure constructed in accordance with my invention, I preferably employ two or more of the spinner lure units upon a supporting wire 1 of appropriate length and in so assembling said units, the same are arranged in longitudinal relation upon the supporting wire in the manner shown in the Figures 1 and 2, the supporting wire passing through the bearing openings in the portions 10 and 11 of the various units while in order that such units may be individually spaced from one another so as to prevent any interference with their respective rotary motion and to reduce friction to minimum, bearing bodies preferably spherical or substantially spherical in shape, designated generally herein by the numeral 13, are employed. As shown in the Figures 1 and 2, one of these spherical bearing members 13 is arranged between the units 3 and 4 while other bearings 13 are arranged adjacent the outer side portions of said units 3 and 4 inwardly of the inner extremities of the elongated loops 2, which, obviously, serve to prevent their lateral displacement and similarly, lateral displacement of the spinner lure units rotatably mounted upon the supporting wire 1. In this connection, particular attention is invited to the peculiar and novel formation of the curved offset flange 11 engaged over one portion of the supporting wire 1. At this point, it will be seen that said flange is so curved as to have a substantially flush bearing with the adjacent curved portion of the spherical body 13 and by consequence, it will be appreciated that any possibility of binding of the adjacent spinner unit thereupon and by consequence, prevention of its rotation upon the adjacent portion of the supporting wire 1 will be avoided; also, that because of the fact that there is flush engagement of the curved portion of the flange 11 with the adjacent portion of the spherical bearing 13, mutilation of said bearing with the resultant wear thereupon during rotation of the spinner unit will be reduced to minimum.

The spinner lure units 3 and 4 are preferably of different colors, for example, the unit 3 may be of white or silver like color whereas the unit 4 may be of yellow or gold-like color. Thus, with rotation of the units during passage of the device through a body of water, it will be readily understood that a variety of distinctly different optical effects will be had because of the reflection of light of different intensities and from different angles upon said units, thus permitting such units to produce a multiplicity of changing color effects, thereby lending materially to the attracting qualities of the device as a fish lure. Obviously, these colors may be changed or varied, such as conditions or preference may dictate.

At this point, it is timely to note that in mounting or assembling the units 3 and 4 upon the supporting wire 1, the respective wings 7 and 8 thereon are arranged at different pitches; that is, the wings 7 and 8 upon the unit 3 are so disposed as to effect rotation of this particular unit in one direction, while the wings 7 and 8 upon the unit 4 are so disposed as to effect rotation of that unit in an opposite direction. Similarly, by varying, even slightly, the relative pitch of the wings 7 and 8 upon the units 3 and 4, the velocity or speed of rotation of the respective units 3 and 4 may be varied and in this connection, I may and preferably do so form the wings 7 and 8 upon one of said units as to cause its rotation at a less velocity than that at which the other or remaining unit or units will be rotated. In this way, other means are provided for producing still further optical effects as the fish lure is moved through a body of water, thus causing the same to act as an effectual stimulus to the "striking" of fish upon the equipped line.

While I have herein shown and illustrated the improved fish lure as consisting of two spinner lure units, it is of course to be fully understood that any number of these units may be employed, such as conditions or preference may dictate, it being desirable at times to utilize three units, at other times four, and so on. Similarly, it is to be understood that the colors of these different units may be varied throughout so as to produce the desired optical effects when the device is drawn through a body of water.

Manifestly, the construction shown is capable of considerable modification, and such modification as is within the scope of my claim, I consider within the spirit of my invention.

I claim:

A fish lure comprising a rod, a spherical bearing rotatable on the rod and a spinner on the rod constructed from a disk of metal provided with a pair of slits extending from the center of the disk through the marginal edge thereof to form an arm curving away from the rod with the free end bent at an angle and provided with a hole for freely receiving said wire, said disk further having wings on opposite sides of the arm and having a marginal portion offset and provided with a hole in alignment with said first hole to receive said wire, said marginal offset portion being curved to conform to a portion of the curved surface of said bearing to form a seat therefor.

In witness whereof I have hereunto set my hand.

FRANKLIN W. HOBBS.